United States Patent
Smith et al.

(10) Patent No.: US 6,845,841 B2
(45) Date of Patent: Jan. 25, 2005

(54) ACOUSTIC ISOLATOR

(75) Inventors: Eric T. Smith, Indianapolis, IN (US); Jeffrey D. Szymanski, Indianapolis, IN (US); Jeff Hedbeck, Ingalls, IN (US); David R. Harbison, Fishers, IN (US)

(73) Assignee: Aluralex Acoustics, Indianapolis, IN (US)

( * ) Notice: Subject to any disclaimer, the term of this patent is extended or adjusted under 35 U.S.C. 154(b) by 26 days.

(21) Appl. No.: 10/191,040

(22) Filed: Jul. 5, 2002

(65) Prior Publication Data
US 2003/0029670 A1 Feb. 13, 2003

Related U.S. Application Data

(60) Provisional application No. 60/303,591, filed on Jul. 6, 2001.

(51) Int. Cl.⁷ .............................. F16F 15/00; E04B 1/82; E04B 1/00; F16M 11/00
(52) U.S. Cl. ........................ 181/207; 181/284; 181/286; 181/290; 248/638; 248/676; 248/678; 248/127; 52/144
(58) Field of Search ................................ 248/634, 638, 248/676, 678, 443, 127, 128, 176.1, 580; 52/144, 145; 181/284, 285, 286, 290, 294, 207, 208, 205, 210, 295

(56) References Cited

U.S. PATENT DOCUMENTS

| | | | | |
|---|---|---|---|---|
| 3,779,337 A | * | 12/1973 | Gregory | 181/151 |
| 4,251,045 A | * | 2/1981 | Meyerle | 248/619 |
| 4,273,213 A | * | 6/1981 | Munz | 181/207 |
| D267,374 S | * | 12/1982 | Karson | D6/85 |
| D267,403 S | * | 12/1982 | Gage | D14/38 |
| 4,379,103 A | * | 4/1983 | Doerfling | 264/45.5 |
| 4,436,274 A | * | 3/1984 | Kramer | 248/633 |
| 4,437,542 A | | 3/1984 | Yeager et al. | |
| 4,493,471 A | * | 1/1985 | McInnis | 248/580 |
| 4,702,046 A | | 10/1987 | Haugen et al. | |
| 4,703,597 A | | 11/1987 | Eggemar | |
| 4,796,397 A | | 1/1989 | Capaul | |
| 4,964,250 A | | 10/1990 | Nelson | |
| 5,009,043 A | | 4/1991 | Kurrasch | |
| 5,069,011 A | | 12/1991 | Jenne | |
| 5,111,579 A | | 5/1992 | Anderson | |
| 5,143,341 A | * | 9/1992 | Juster | 248/444 |
| 5,169,104 A | * | 12/1992 | Kwoh | 248/176.1 |
| 5,245,141 A | * | 9/1993 | Fortez et al. | 181/288 |
| 5,327,698 A | | 7/1994 | Uhl | |
| 5,418,257 A | * | 5/1995 | Weisman | 521/54 |

(List continued on next page.)

FOREIGN PATENT DOCUMENTS

| | | | | |
|---|---|---|---|---|
| DE | 4002547 | | 8/1991 | |
| JP | 59229991 A | * | 12/1984 | H04R/01/00 |
| JP | 01012794 A | * | 1/1989 | H04R/01/00 |
| JP | 20001189979 A | * | 7/2001 | H04R/01/00 |

OTHER PUBLICATIONS

Auralex Acoustics 2001–Complete Product Guide, pp. 10–11; p. 15; pp. 18–20.

*Primary Examiner*—Kimberly Lockett
*Assistant Examiner*—Patrick Miller
(74) *Attorney, Agent, or Firm*—E. Victor Indiano; Indiano, Vaughan, Roberts & Filomena, LLP

(57) ABSTRACT

An acoustic isolator is placeable between a sound producing body and a resting surface. The acoustic isolator includes a foam member having a first surface for receiving the sound producing body and a second surface for engaging the resting surface. The foam member is composed of a supportive foam member capable of substantially preventing the transfer of sound induced vibrations between the sound producing body and the resting surface while sustaining an internal deflection of less than about thirty percent.

25 Claims, 9 Drawing Sheets

U.S. PATENT DOCUMENTS

| | | |
|---|---|---|
| 5,572,847 A | 11/1996 | Elmore et al. |
| 5,573,220 A * | 11/1996 | Whittaker et al. .......... 248/638 |
| 5,618,602 A | 4/1997 | Nelson |
| 5,622,012 A | 4/1997 | Schijf |
| 5,641,950 A | 6/1997 | Kotter |
| 5,643,139 A | 7/1997 | Stout et al. |
| 5,651,405 A | 7/1997 | Boeddeker et al. |
| 5,780,785 A * | 7/1998 | Eckel ........................ 181/295 |
| 5,896,710 A | 4/1999 | Hoyle |
| 5,929,395 A * | 7/1999 | Bizlewicz ................... 181/207 |
| 6,007,890 A | 12/1999 | DeBlander |
| 6,085,861 A | 7/2000 | Jines |
| 6,177,180 B1 * | 1/2001 | Bodine et al. .............. 428/223 |
| 6,244,378 B1 | 6/2001 | McGrath |
| 6,523,794 B2 * | 2/2003 | Ueno ...................... 248/188.1 |
| 6,623,676 B1 * | 9/2003 | Davis et al. ................ 264/112 |

\* cited by examiner

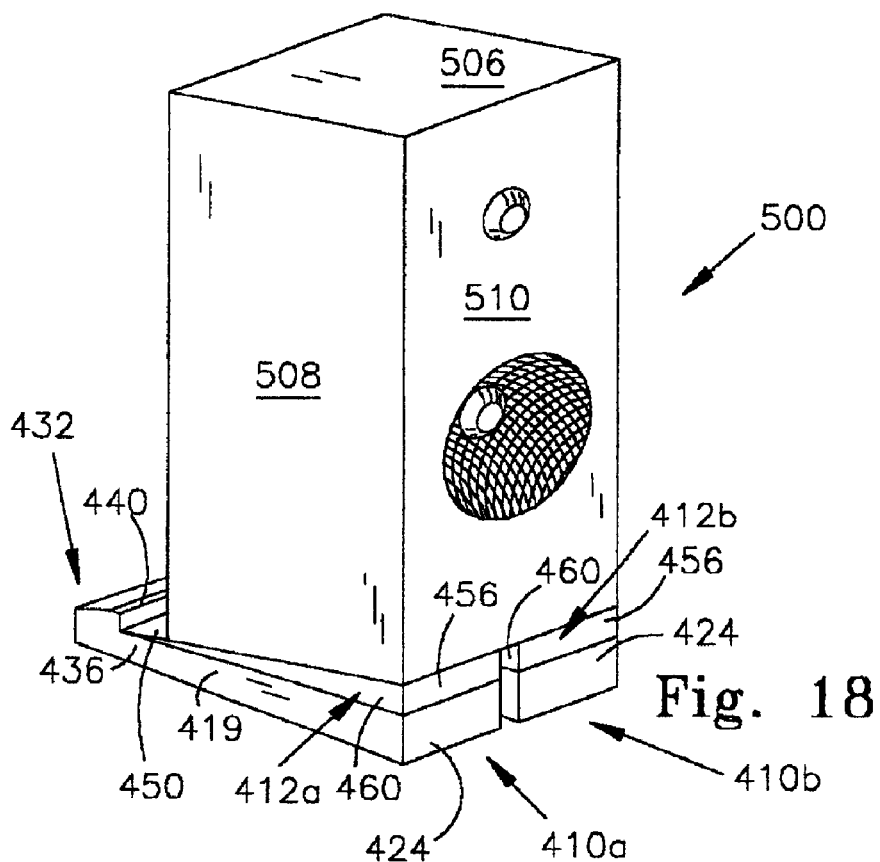
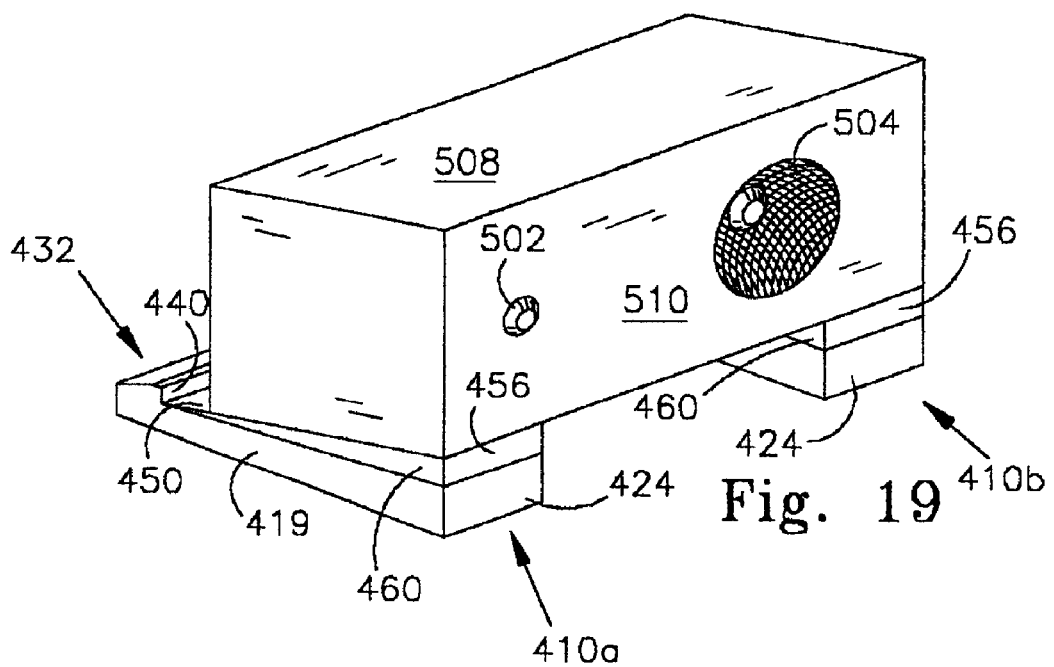

ACOUSTIC ISOLATOR

I. CLAIM OF PRIORITY

The application claims priority to Smith, Szymanski and Hedbeck, U.S. Provisional Application filed Jul. 6, 2001 as U.S. patent application Ser. No. 60/303,591.

II. TECHNICAL FIELD OF THE INVENTION

The present invention relates to acoustic isolators and more particularly, to acoustic isolators designed to isolate the vibrations produced by a speaker cabinet from the surface on which the cabinet rests, such as a stage, or room flooring.

II. BACKGROUND OF THE INVENTION

For many years speaker cabinets have been used to produce sounds from sound producing devices, such as musical instruments, amplifiers, stereos, TV's, and other electrically operated sound producing devices. Currently, a wide variety of speaker cabinets exist. These speaker cabinets contain a variety of different speaker types, such as traditional cone type speakers, and non-cone containing electrostatic speakers. The speaker cabinets themselves can be small, such as those typically found with computer systems: mid-size, such as the floor-restable speakers typically purchased as a part of home-use stereo systems and home theater systems; large, such as the amplifier-containing speaker cabinets typically used by a "bar-band", and disk jockeys; and very large, such as the speaker cabinets that are employed to project sound into large venues, such as concert halls, and stadiums.

Regardless of the size of the speaker cabinet, or the type of speakers employed, certain characteristics are true of all speaker cabinets. One such characteristic is that vibrations are produced as a by-product of the production of sound. These vibrations are expected, as the basis of sound is the production of vibrations, with the pitch being dependent upon the frequency of the vibrations. These speaker cabinet-produced vibrations are capable of inducing vibrations in the environment, such as the room or concert hall, in which the speaker cabinets operates. In particular, the vibrations produced by the speakers within a speaker cabinet can cause the speaker cabinet housing to vibrate. These vibrations produced by the speaker cabinet housing can induce vibrations into the surface on which the speaker cabinet is placed.

In most situations commonly encountered by consumers, these vibrations do not create much problem, and are handled quite well by the vibration-resistant properties of the cabinet in which the speakers are placed. If additional sound isolation is necessary for many small, consumer type speaker cabinets, an acoustic isolator, such as a bath towel, carpet, or blanket can be placed between the speaker cabinet and the surface on which it rests, to help isolate the speaker cabinet's vibrations from the floor or other surface on which the speaker cabinet rests.

As a general rule, the amount of vibrations produced by a speaker cabinet is dependent upon the manner in which the speaker cabinet is constructed, the materials from which the cabinet is constructed and the volume of sound being produced by the speakers. In accordance with this general rule, the amount of vibrations produced by a speaker cabinet of a given particular construction and material composition will generally be dependent upon the volume (loudness) of the sound being produced by a speaker cabinet.

As the amount of vibration produced by a speaker cabinet is dependent upon volume level, the difficulty of isolating vibrations produced by a speaker cabinet from its resting surface is also generally proportional to the volume of the sound being produced. Therefore, the placement of a towel or carpet scrap under a "home-sized" speaker cabinet played at normal listening volume levels may be sufficient to acoustically isolate the speaker cabinet from the floor of the residence. However, a towel or carpet remnant may not be sufficient to acoustically isolate the speaker cabinet used by a "bar band," or an arena or stadium performer from the stage or other floor surface on which the speaker cabinet rests; or, for that matter, even a "home-sized" speaker cabinet that is played at high, "party-level" volume levels. As such, although the acoustic isolator of the present invention is well suited for acoustically isolating vibrations produced by speakers of almost all available sizes, the enhanced acoustic isolation properties of the present invention are especially well adapted to those situations where:

(a) a large volume level of sound is being produced, such as the volume level of sound produced by a bar-band, a concert hall performer, a diskjockey, or the like; and/or (b) a greater acoustic sensitivity exists, thus making an enhanced need for acoustic isolation desirable.

Examples of places having enhanced acoustical sensitivity include both commercial establishments and residential dwellings. A recording studio is an example of a commercial establishment where enhanced acoustic isolation is desirable, since it is important to be able to control the level and characteristics of the sound being produced and recorded in the studio, in order to achieve the sound desired on the recording.

An example of an acoustically sensitive residential area is multi-unit residential structure, such as an apartment building or condo, where the sounds and vibrations produced in one unit, will often cause vibrations and noise in an adjoining unit. As the sound producer's neighbors within her multi-unit residence are not likely to appreciate the vibrations produced by the sound producer's speaker cabinets, an acoustic isolator can help to reduce the perceived nuisance caused by the sound produced by speaker cabinets played at a volume loud enough to cause vibrations to be transmitted into adjoining units. Similar concerns exist in single unit dwellings where children enjoy playing music at volume levels greater than those levels preferred by their parents.

As stated above, acoustic isolators are known, and can consist of something as simple as a towel or carpet scrap placed between the speaker cabinet and the surface on which it rests. Nonetheless, room for improvement exists. In particular, room for improvement exists in acoustically isolating the vibrations produced by a high output, high volume (loudness) speaker cabinet from the surface upon which it rests. Additionally, room for improvement exists in producing enhanced acoustical isolation between a speaker cabinet and the surface upon which it rests for low and moderate output speaker cabinets used in acoustically sensitive environments.

Therefore, one object to the present invention is to provide an acoustic isolator that helps to provide acoustical isolation between the vibrations produced by high output speaker cabinets and the surface upon which the cabinet rests.

Another object of the present invention is to provide an acoustic isolator that helps to acoustically isolate the vibrations produced from a moderate or low output speaker cabinet, from the surface on which it rests, in an acoustically sensitive environment.

III. SUMMARY OF THE INVENTION

In accordance with the present invention, an acoustic isolator is placeable between a sound producing body and a resting surface. The acoustic isolator comprises a foam member having a first surface for receiving the sound producing body and a second surface for engaging the resting surface. The foam member comprises a supportive foam member capable of substantially preventing the transfer of sound induced vibrations between the sound producing body and the resting surface while sustaining an internal deflection of less than about thirty percent.

Preferably, the acoustic isolator, in one embodiment, comprises a platform member, and one or more platform support members. The platform member is made from a generally stiff, board like material, and includes a generally planar upper surface, and a lower surface. The upper surface is designed to provide a supporting surface, upon which a speaker cabinet can be placed. The platform support members are fixedly joined to the underside surface of the platform. The platform support members include an upper surface which is attachable, such as by glueing, to the platform member, and a ground engaging lower surface. Preferably, the lower surface of the platform support member is planar, to squarely engage the floor surface upon which it rests.

The platform support members are preferably comprised of a sound and vibration absorbent material, such as a foam. This foam is chosen to be sufficiently strong ("hard") and non-deformable enough to support the speaker cabinet, but sufficiently "soft" to have good sound and vibration absorbance characteristics.

One feature of one embodiment of the present invention is that it contains platform support members that are both sufficiently non-deformable to support the weight of one or several conventional speaker cabinets placed upon the isolator, but still soft enough to have good sound absorption, and acoustic vibration isolating characteristics. This feature has the advantage of enabling the user to support the weight of one, or several speaker cabinets upon a stage in an upright position, without fear that the acoustic isolator will be too "pillow-like" and thereby deform under the weight of the speaker cabinet, such deformation can cause the speaker cabinet to tilt, wobble and possibly fall over.

Another feature of this embodiment of the acoustic isolator of the present invention is that the platform member itself is preferably made from a vibration resistant material, that is covered in a sound absorbent fabric to further dampen vibrations. This feature has the advantage of providing a support for the speaker cabinet that is rigid enough to support the speaker cabinet with only minimal deflection or distortion of the platform surface, while still maximizing the ability of such a solid, rigid surface to absorb vibrations of the speaker cabinet.

A rather surprising feature of the present invention is that the acoustic isolation achieved by the present invention actually helps to improve the sound quality produced by the speaker cabinet. In this regard, it has been found by the applicants that the vibrations induced in a floor or stage surface by the vibrations produced by the speaker cabinet add a sound of their own to the sound produced by the speaker cabinet, thereby creating a "composite" sound. The primary contributions of the additional floor vibrations are that they tend to "muddy" the sound produced by the speakers, thereby detracting from the overall sound quality of the speaker cabinet. By reducing these floor vibrations, the acoustic isolator of the present invention enables the speaker cabinet to produce a crisper, cleaner sound, that more closely emulates that sound intended to be produced by the speaker cabinet by the designer and/or manufacturer of the speaker cabinet.

The Applicants have found that the acoustic isolator of the present invention is especially useful for isolating the transfer of low frequency vibrations between a speaker cabinet and the surface on which it rests. As low frequency vibrations tend to travel through different media (such as apartment walls) more pervasively than high frequency sounds, it is especially important for the isolator to be able to isolate the low frequency vibrations from the stage or other surface on which the speaker cabinet rests in order to clarify the sound produced by the cabinet. Also, since low frequency vibrations contribute more significantly to the muddying of the sound created by the speaker cabinet, the reduction of the transference of low frequency sounds to the stage or floor has a large impact on the resulting enhanced clarity of the sound produced by the speaker cabinet.

These and other features and advantages of the present invention will become apparent to those skilled in the art by review of the detailed description of the preferred embodiment of the present invention contained herein, which sets forth the best mode of producing the invention as perceived presently by the Applicants.

IV. BRIEF DESCRIPTION OF THE DRAWINGS

FIG. 18 is a perspective view of the second alternate embodiment acoustic isolator supporting an "upright" speaker cabinet in an intensely-upwardly inclined orientation;

FIG. 19 is a perspective view of the second alternate embodiment acoustic isolator supporting a "laid-down" speaker cabinet in an intensely-upwardly inclined orientation.

V. DETAILED DESCRIPTION

Figure 1:
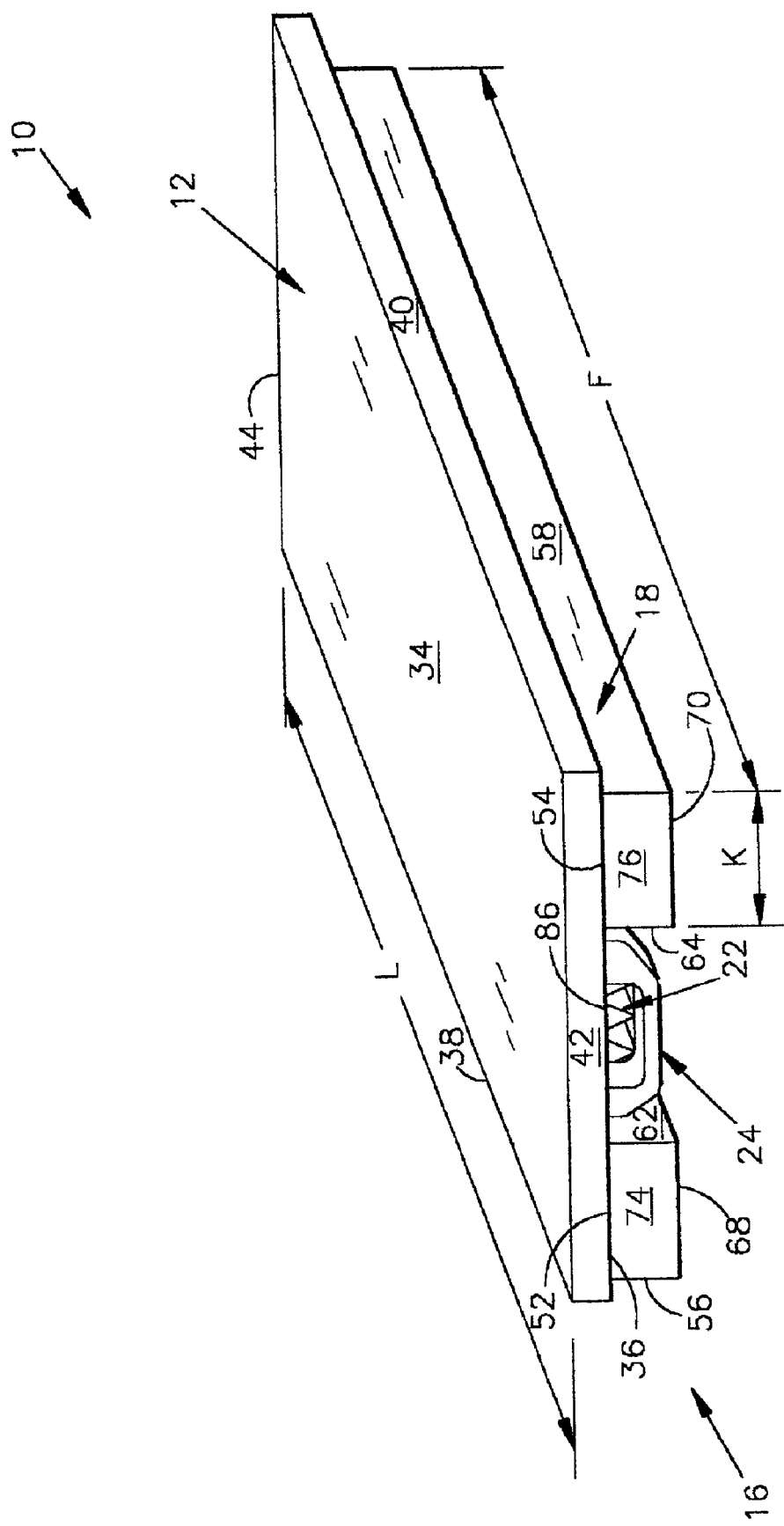
FIG. 1 is a perspective view of the acoustic isolator of the present invention.
Figure 2:
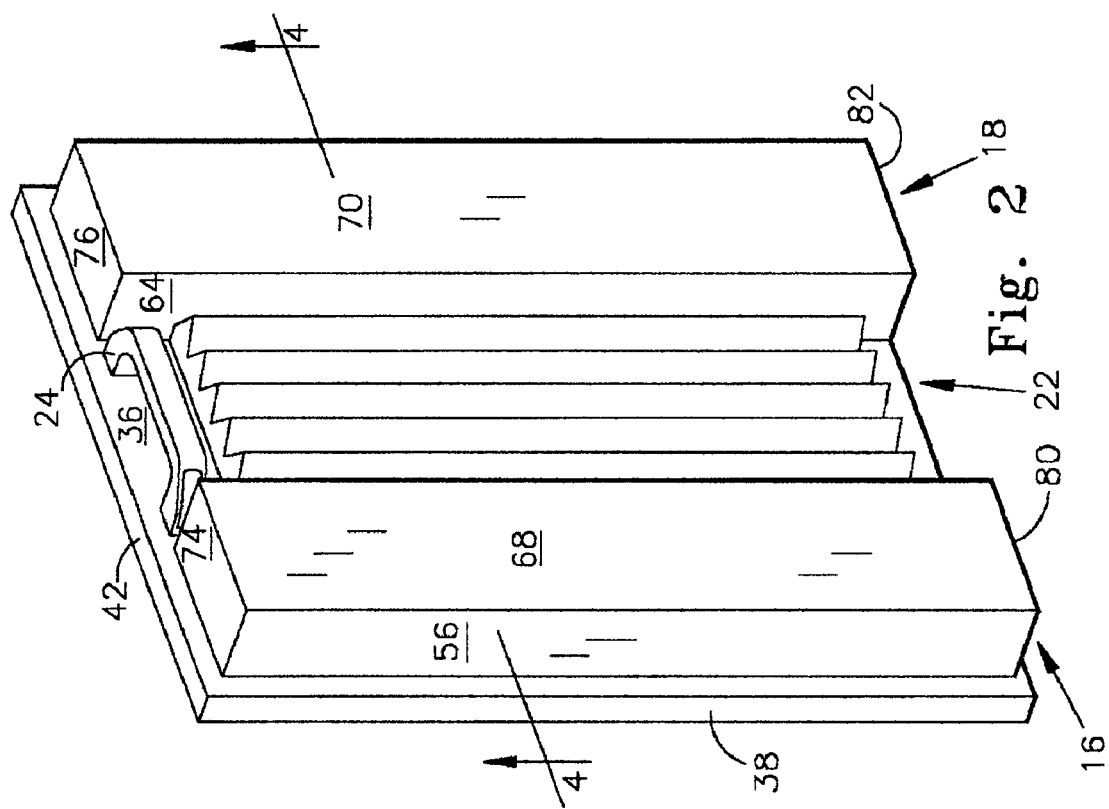
FIG. 2 is a perspective view of the underside surface of the acoustic isolator of the present invention.
Figure 3:
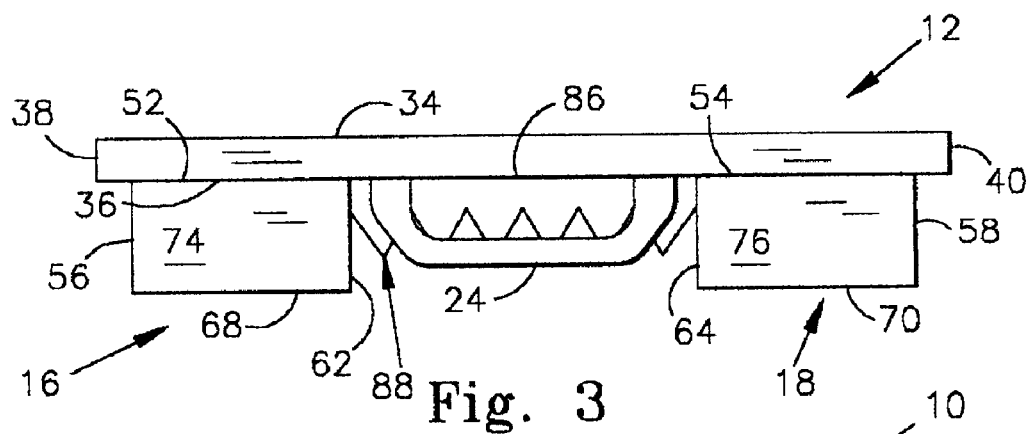
FIG. 3 is an end view of the acoustic isolator of the present invention.
Figure 4:
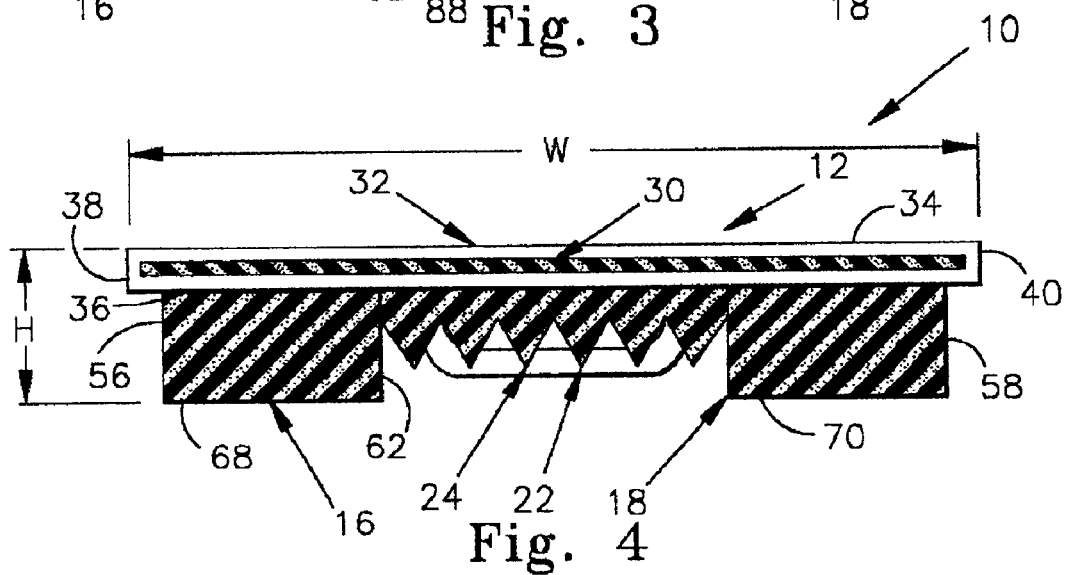
FIG. 4 is a sectional view taken generally along lines 4—4 of FIG. 2.

The acoustic isolator 10 of the present invention is shown in FIGS. 1–7 as including a platform portion 12, first and second, longitudinally extending, acoustically-isolating platform support members 16, 18. A sound absorber panel 22 which is affixed to the underside surface of the platform 12, and a handle 24 is disposed at one end of the isolator 10 for facilitating transport of the acoustic isolator 10. The platform 12 is generally shelf-like in configuration, and includes a core member 30 that is wrapped with a fabric-like cover member 32.

The acoustic isolator 10 is sized generally to be large enough to accommodate and support a sound producing body such as a typical high volume output, professional type speaker cabinet, such as the speaker cabinets that one would find being used by an electrically amplified band of the type that performs in a bar, theater, stadium, or other concert venue. Additionally, as described in connection with FIG. 20, the acoustic isolator 610 can be used in connection with a sound producing body such as a stereo turntable 612. Although a wide variety of sizes are possible, one preferred embodiment of the present invention is designed to have a width, "w", of approximately 15.1875 inches (38.6 cm); a length, "l", of 23.5 inches (59.7 cm); and a height, "h", of approximately 2.6875 inches (6.83 cm). These length and width dimensions yield an acoustic isolator 10 having a planar platform surface area of approximately 357 square inches (2304.4 sq cm).

Figure 6:
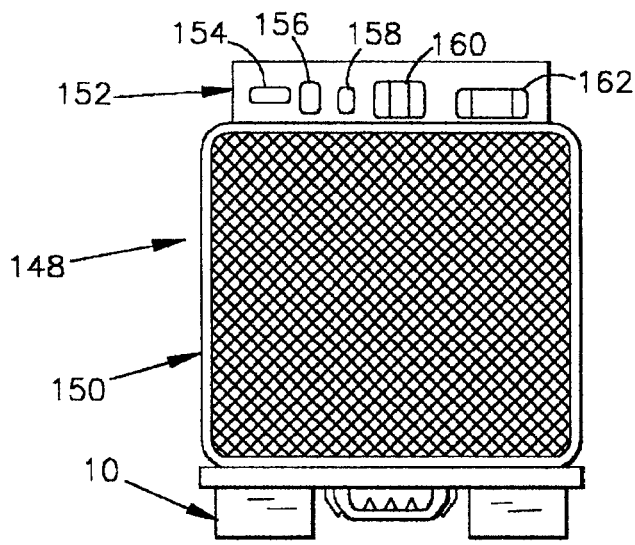
FIG. 6 is a front view of an amplifier-type speaker cabinet placed upon an acoustic isolator of the present invention.

Although the isolator 10 can be made either smaller or larger to accommodate different sized speaker cabinets, the applicants have found that the dimensions said forth above yield an acoustic isolator 10 having an upper surface area and surface shape that will accommodate most commercially available professional speaker cabinets such as the cabinet 148 shown in FIG. 6. Additionally, for accommodating larger speaker cabinets such as cabinet 206 of FIG. 7, two or more acoustic isolators 10, 210 can be placed in a side-by-side relation. When so placed, the two (or more) isolators 10, 210 create an upper platform surface large enough, and sized appropriately for receiving the underside surface of a larger speaker cabinet, 206 such as the very large speaker cabinets that one might find used in connection with a performance at a very large stadium or concert pavilion type venue, such as Madison Square Garden, the RCA Dome, Shea Stadium; and the Verizon music pavilion.

The platform 12 includes a generally planar upper surface 34 for receiving the underside surface of a speaker cabinet. The platform 12 further includes a lower surface 36 that is generally identical in size and configuration to the upper surface 34. The platform 12 also includes a first long-side surface 38, a second long-side surface 40; a first short-side surface 42, and a second short-side surface 44.

Preferably, the core 30 is constructed of a medium density fibreboard material, that is similar to the material from which most professional grade amplifier and speaker cabinets are made. The material chosen for the core 30 should possess several important characteristics. The first characteristic is strength, as the core 30 should be strong enough to support the weight of one or more speaker cabinets placed thereon (See FIG. 5). Although speaker cabinets can have widely varying weights, most commercial grade speaker cabinets weigh between 80 and 200 pounds (36.4 and 90.9 kg.), with a stack of three speaker cabinets normally weighing between about 240 and 600 pounds (109.1 and 273 kg.). The material from which the core 30 is made should be strong enough to support this weight. To achieve this desired strength, one can vary one or both of: (1) the type of material used; and (2) the thickness of the material used, as generally, thicker slabs of material tend to be stronger, and capable of supporting more weight than thinner slabs.

The second important characteristic of the material is the propensity of the material to resonate. In this regard, materials showing a high propensity to resonate are less desirable than materials with a lower propensity to resonate. A third characteristic is cost. Preferably, the core material comprises a material that is relatively low in cost, to enable the manufacturer to sell the product at a reasonable price.

A fourth characteristic is rigidity. Rigidity is closely tied to strength, and relates to the reluctance of the material to deform, such as by flexing, bowing or bending. Such bowing or bending is undesirable, as significant bowing or flexing of the core 30 contributes to the instability of the speaker cabinet upon the isolator 10. Although core 30 rigidity is important even when a single speaker cabinet is placed on the acoustic isolator 10 (e.g. cabinet 150 of FIG. 6), rigidity becomes much more important when the acoustic isolator 10 is holding a stack of speaker cabinets, such as the three stacked speaker cabinets 140, 142, 144 shown in FIG. 5.

When choosing a core 30 material, the above four factors should be balanced to create a platform 12 that is rigid, sufficiently strong to bear the weight of the speaker cabinet, has a low propensity to resonate, and is relatively inexpensive and rigid. In the present invention, the applicants chose a medium density fibreboard because it represents a good balance of the desired characteristics, although materials other than a medium density fibreboard can be employed.

To better understand the value and choice of medium density fibreboard, it is helpful to compare it against other potential materials. For example, plywood and Masonite can be used as cores 30 for platform 12. However, plywood and Masonite, while having the advantage of being less expensive than medium density fibreboard, also resonate more readily, and hence have less desirable acoustic properties than medium density fibreboard. Similarly, metal performs more poorly than medium density fibreboard because of its resonance properties and its weight (density). Some plastics and solid wood boards, such as oak or pine are also less desirable than medium density fibreboard because of their tendency to resonate.

Some other materials work quite well, but have other drawbacks. For example, a special birch plywood exists that, along with high density fiberboard have favorable acoustic properties. However, each of the birch plywood and high density fiberboard is significantly more expensive than medium density fibreboard. It has been found by applicants that the incremental increase in favorable acoustic properties achieved either by the birch plywood or the high density fiberboard (when compared to medium density fiberboard) do not warrant the greater expense associated with those materials.

Another characteristic of the medium density fibreboard used in core 30 of the present invention is that it is strong enough to support the weight of the speaker cabinets. To achieve a core of sufficient strength, the applicants have chosen an approximately ½ inch thick slab of fibreboard. Similarly, they have found that 0.25 inch thick medium density fibreboard core 30 generally does not possess sufficient rigidity. On the other hand, using a thicker, and hence stronger fibreboard sheet (e.g. 0.75 inches thick, one inch thick, etc.), while providing a stronger platform 12, has undesirable characteristics which outweigh the beneficial increase in strength. In particular, the additional weight imparted to the acoustic isolator 10 makes the isolator 10 heavier, thus making it more difficult and expensive to ship, and more cumbersome for the musician to carry.

As stated above, the covering material 32 of the platform 12 is preferably made from an ozite material. An ozite material is generally similar in appearance to material used by automotive manufacturers as trunk liners, or trunk liner coverings. The ozite material serves well in the present application because it is thin, relatively inexpensive, and has good sound and vibration absorption properties. Preferably, the ozite material 32 is more "fabric like" in thickness, rather than "carpet like." A thin, fabric like material is preferred for reasons related to the stability of the speaker placed thereon. For example, a high pile carpet type platform covering material might deform under the weight of the speaker cabinet, thus decreasing the stability of the speaker cabinet upon the platform 12. However, other material and synthetic cloth materials can be used in place of the ozite cloth, albeit with different performance sound absorbence characteristics.

The support members 16, 18, are preferably comprised of an acoustically isolating, vibration absorbing material, such as a foam. Each of the support members 16, 18 generally comprises a bar shaped member having a rectangular cross section. Each of the support members 16, 18 are generally identical in configuration. In the preferred embodiment of the acoustic isolator 10 described above, each of the support members have the length, F of approximately 22.5 inches, (57.1 cm) a height, G, of approximately 2 inches, (5.1 cm) and a width, K of approximately 3.75 inches (9.5 cm).

It will be appreciated that the dimensions set forth above are merely illustrative, and that platform members having dimensions other than those discussed above would also likely serve the acoustic isolator 10 of the present invention. Each of the support members 16, 18, includes an upper side surface 52, 54 which is fixedly attached, such as by gluing, to the under side surface 36 of the platform 12. Each of the support members 16, 18 includes an outer side surface 54, 56, respectively, which is shown in the drawings as being preferably planar. Although the planarity of the upper surfaces 52, 56 is important, as these surfaces are glued to the under side surface 36 of the platform, there are no such constrictions on the shape of the outer side surfaces 56, 58. As such, they could be a variety of shapes, such as convexly or concavely semi-cylindrical. However, it will also be appreciated that outer side surfaces 56, 58 should be designed to enable the support members 16, 18 to have a constant cross section, to facilitate extrusion of the support members 16, 18.

The support members also include inner side surfaces 62, 64 which, although shown as planar, need not be, and can be any shape, similar to those discussed in connection with the outer side surfaces 56, 58. Planar ground engaging bottom surfaces 68, 70 are provided for enabling the support members 16, 18 to firmly and squarely engage the floor or stage surface on which the acoustic isolator 10 is placed. The ground engaging bottom surfaces 68, 70 are preferably co-planar, and extend in a plane generally parallel to the plane in which each of the upper surfaces 52, 54 extend. Additionally, the support members 16, 18 each include a first end surface 74, 76 and a second end surface 80, 82.

As alluded to above, the support members 16, 18 are preferably comprised of a dense foam material. When choosing the foam material from which the support members 16, 18 are made, several characteristics should be kept in mind. The primary characteristic is that the foam should have a relatively small amount of deformability, and in particular, a small amount of compressibility. A foam having a relatively small amount of compressibility is better able to withstand the weight of a speaker cabinet placed on the isolator 10 without deforming. Deformation is generally to be avoided, as it tends to induce instability, by creating a "pillow" effect. Another characteristic the foam should have is density, as the Applicants have found that a denser foam tends to be less compressible than a less dense foam. As such, a dense foam helps to achieve the desired low compressibility characteristics described above.

A further, important characteristic of the foam chosen for the support members 16, 18 is the ability of the foam to absorb vibration, and thereby isolate any vibrations of the platform member 12 from the stage or floor surface on which the acoustic isolator 10 rests. Although materials such as wood and metal have highly favorable compressibility and density characteristics, such materials are also poor acoustic isolators. On the other hand, a very soft, highly compressible material such as a typical household sponge, would likely have good acoustic isolation properties. However, a sponge would be too easily compressible to stably support the speaker cabinet placed upon the platform.

It has been found by the Applicants that foams having a range of characteristics will serve well as acoustic isolators. The primary measurements used for characterizing the foam are density, firmness, and acoustic isolation range. It has been found by the applicants that the preferred range of these characteristics are as follows.

1. Firmness: Between about 70 and 200 pounds for 25% I.F.D (Internal Force Deflection), and preferably between 115 and 135 pounds for 25% I.F.D.
2. Density: Preferably between 2.3 and 2.5 pounds per cubic foot.
3. Acoustic Isolation Ability: Preferably between 6 and 10 decibels.

These characteristics combine to provide an acoustical isolator which has good acoustic isolation properties, while being capable of supporting speaker cabinet weights of about 400 pounds without significant deformation or compression, when the isolator 10 has the dimensions and configuration of the isolator 10 discussed above.

Significant compression not only affects the stability of the isolator 12 and speaker cabinet stack, but also affects the acoustic isolation properties of the isolator, as the acoustic isolation properties of the support members 16, 18, decrease with increased compression of the support members 16, 18. Although the decrease in acoustic isolation properties is not significant over the weight ranges discussed above, the acoustic isolation could be more significant at greater weights. As a corollary, the use of a significantly softer, less dense foam, would cause a speaker cabinet of a given weight to compress its support members 16, 18 more significantly, thus resulting in a greater decrease in the support members' acoustic isolation properties.

The sound absorber panel 22 includes a generally planar upper surface 86 that is fixedly attached to the under side surface 36 of the platform 12. The lower surface 88 of the absorber panel 22 had a re-occurring wedge array pattern, comprising a parallel series of elongated, triangular cross section shaped ridges. The sound absorber panel 22 is provided both for aesthetic purposes, and also for helping to trap sounds on the under side surface of the acoustic isolator 10, to thereby prevent unwanted reverberations and vibrations. As the support panel 22 is not a weight bearing panel, the material chosen for the sound absorber panel 22 can be one that maximizes sound absorption characteristics, without significant regard for the material's weight bearing characteristics. Therefore, the sound absorber panel 22 can be made of a significantly "softer," less firm foam material than the material from which the first and second support members 16, 18 are made. In this regard, a foam material having a firmness of less than 70 pounds for 25 Internal Force Deflection will suffice nicely.

Handle 24 preferably comprises a plastic handle that is fixedly coupled to the under-side surface 36 of the platform 12. Although the handle 24 can be pivotably mounted to the platform 12, any pivotable mounting between the handle 24 and the platform 12 should be done in a manner that prevents the pivot mounting from creating unwanted noise or vibrations.

Figure 5:
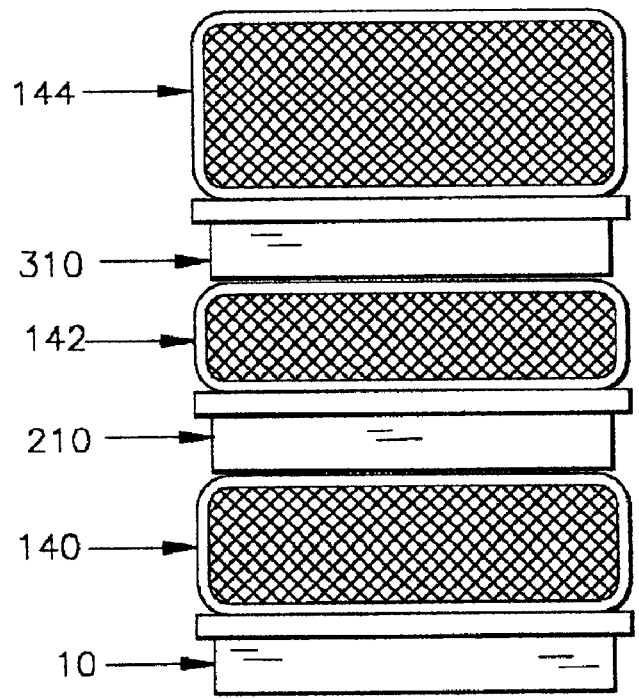
FIG. 5 is a front view showing a stack of speaker cabinets wherein acoustic isolators of the present invention are sandwiched between adjacent speaker cabinets of the stack.
Figure 7:
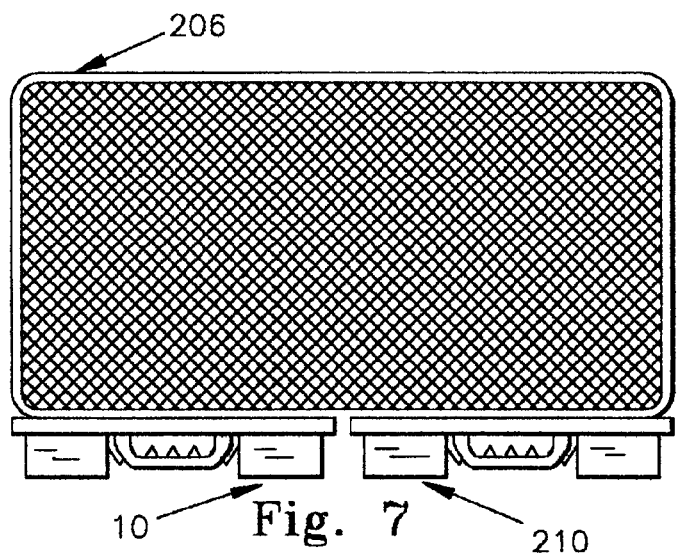
FIG. 7 is a front view of a pair of acoustic isolators placed in a side-by-side arrangement to support a speaker cabinet having a base significantly larger than the platform of a single acoustic isolator.

Turning now to FIGS. 5, 6 and 7, the acoustic isolator 10 of the present invention will be shown in use.

In FIG. 5, a plurality of acoustic isolators 10, 210, 310 are shown being used in a speaker cabinet stacking arrangement. The first, or lower acoustic isolator 10 is placed on the surface of a stage, and the first speaker cabinet 140 is placed on the upper surface 34 of the platform 12 to rest thereon. A second acoustic isolator 210 is placed with its ground engaging lower surfaces 68, 70 of its support members 16, 18 on the upper surface of the first speaker cabinet 140, so that the second acoustic isolator 210 rests upon the upper surface of the first speaker cabinet 140. A second speaker cabinet 142 is then placed on upper surface 34 of the second acoustic isolator 210. Similarly, a third acoustic isolator 310 is placed on the upper surface of the second speaker cabinet 142 to rest thereon, while a third speaker cabinet 144 is positioned to rest upon the upper surface of the third acoustic isolator 310.

The embodiment shown in FIG. 5 comprises a speaker cabinet "stack" where three acoustic isolators 10, 210, 310 are used to minimize the vibrational transfer between the speaker cabinets 140, 142, 144. It will also be appreciated that the three speaker cabinets 140, 142, 144 may be placed directly on top of each other without the imposition of the second and third acoustic isolators, 210, 310, there between, although this arrangement would likely result in reduced acoustic isolation between the three speaker cabinets 140, 142, 144 when compared to the "sandwich" arrangement shown in FIG. 5. Nonetheless, even the use of a single acoustic isolator 10 under the three speaker cabinets 140, 142, 144, significantly improves the isolation of the vibrations of the speaker cabinets 140, 141, 144 from the stage or other floor surface upon which they rest. An important thing to note about this configuration is that the first or lower acoustic isolator 10 must bear the weight of three speaker cabinets 146, 144, 142 and two acoustic isolators 210, 310. As performers are often likely to employ such "stacked" arrangements, the applicants have chosen support members 16, 18, and core members 30 designed to withstand such weights imposed by "stacked" cabinet arrangements.

FIG. 6 illustrates an acoustic isolator 10 of the present invention used in connection with an amplifier type speaker cabinet 148, having a speaker cabinet portion 150, and an amp-head portion 152. The amp-head portion 152 contains electronic amplifier circuitry, along with a variety of controls for controlling the operation of the amplifier 148. These controls can include the normal controls found on typical amplifiers. For example, the amplifier head 152 shown in FIG. 6 contains a power switch 154, a sound effects (e.g. reverb) switch or control knob 156, an LED. power on indicator 158, a first sound effects control switch (e.g. volume knob 160), and a second sound effects control switch or knob, such as a graphic equalizer 162.

Turning now to FIG. 7, a large speaker cabinet 206 is shown that includes a base having a surface area greater than the surface area of a single acoustic isolator 10. To accommodate the size of this cabinet 206, a first and second acoustic isolator 10, 210, are placed in a side by side, co-planar arrangement to support the entire base surface of the speaker cabinet 206. If necessary, three or more acoustic isolators can also be placed in the side by side arrangement, to support a speaker cabinet having a base surface area too large to be handled by a pair of side by side acoustic isolators 10, 210 shown in FIG. 7. It will also be appreciated that use of multiple acoustic isolators increases the weight bearing capacity of the acoustic isolator array.

It should further be noted that although the two acoustic isolators 10, 210 are shown in FIG. 7 as underlaying the entire lower surface of speaker cabinet 206, most speaker cabinets are sufficiently strong, and the acoustic isolators 10, 210, are capable of bearing sufficient weight, so that the acoustic isolators can be spaced apart. As such, a pair of spaced-apart isolators 10, 210 can support a speaker cabinet having a significantly larger lower surface area than the combined upper surface area of the platforms 12 of the two acoustic isolators 10, 210.

It should also be noted that the speaker cabinets 140, 142, 144, 150 and 206 can be rotated 90° or 180°, or 270° about their vertical axes, to change the orientation of the cabinets upon the acoustic isolators. From the dimensions given above, it will be appreciated that the speaker cabinets are shown to have their speaker case fronts extend along the short side of the acoustic isolator 110, 210, 310. Such an arrangement works well for speaker cabinets having greater depth than width dimensions. However, since most speaker cabinets tend to be more wide than deep, the majority of the speaker cabinets would likely be oriented to rest upon the acoustic isolator 10 in a position approximately 90° rotated from the position that is shown in FIGS. 5, 6 and 7.

Figure 8A:
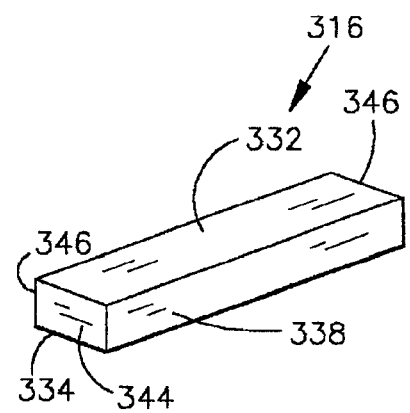
FIG. 8a is a perspective view of the first alternate embodiment acoustic isolator shown in FIG. 8.
Figure 8:
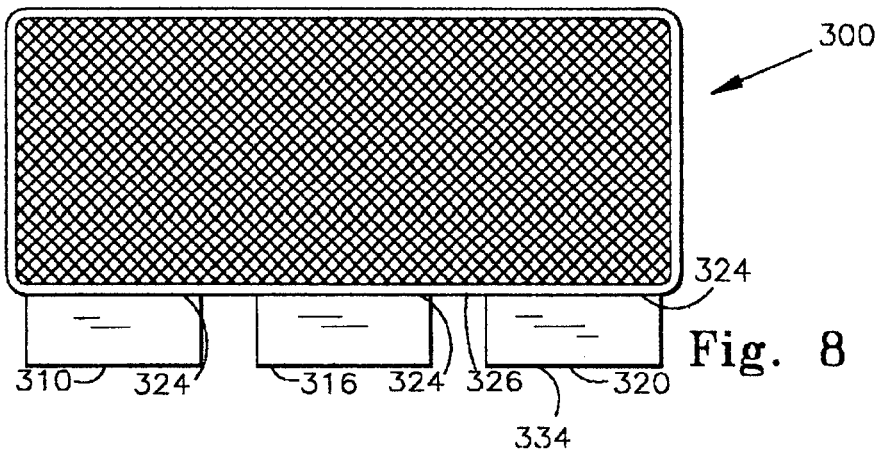
FIG. 8 is a front view of a first alternate embodiment acoustic isolator shown supporting a speaker cabinet.

FIGS. 8 and 8a show a first alternate embodiment of the present invention wherein a set of acoustic isolators 310, 316, 320 are used for acoustically isolating the vibrations of a speaker cabinet 300 from the surface upon which it rests. The acoustic isolators 310, 316, 320 are shown as being generally identical to each other, but different from the acoustic isolators 10, shown in FIGS. 1–7.

Sample acoustic isolator 316 of the second embodiment is shown in FIG. 8a. As will be noticed, the embodiment acoustic isolator 310 is generally rectangular cuboid in configuration, similar to a somewhat elongated brick. The isolator 316 includes an upper, generally planar surface 332 and a lower generally planar surface 324. As discussed in connection with the acoustic isolator 10 shown in FIGS. 1–7, the upper and lower surfaces 332, 324 generally must be planar in order to stably accommodate the underside surface 326 of a speaker cabinet on the floor or stage surface upon which the acoustic isolator 316 rests. The isolator 316 also include longitudinally extending first and second side surfaces 338, 340, each of which are disposed in planes that are generally perpendicular to the planes of the upper and lower surfaces 332, 334. First and second end surfaces 344, 346 comprise the final two surfaces of the brick-shaped acoustic isolator 316.

As also discussed in connection with the respective side and surfaces of acoustic isolator 10, the particular shape and configuration of the side surfaces 338, 340 and end surfaces 344, 346 is not restricted to planar configurations. Rather, a variety of different configurations can be used, with the shape of such configurations determined by both aesthetic and functional considerations. For example, the first and second side surfaces 338, 340 can be convexly arcuate to create a truncated-ovaloid shaped acoustic isolator, to enhance the aesthetics of the acoustic isolator 316. Alternately, the side surfaces 338, 340 and end surfaces 344, 346 can be shaped as a series of parallel, triangular-in-cross-section ridges similar to sound absorber panel 22 (FIG. 1). Similar to sound absorber panel 22, the use of a series of parallel ridges for the side surfaces 338, 340 and end surfaces 344, 346 would increase the surface area of the acoustic isolator 316, thereby increasing its sound absorbing properties. This increase in sound absorbing properties is useful in absorbing stray sounds that became trapped in the space between the underside surface of the cabinet and the stage.

Optionally, the upper surface 332 of the acoustic isolator 316 can include an adhesive surface for adhesively attaching the acoustic isolator 316 to the underside surface 324 of the speaker cabinet 300. This adhesive attachment can comprise a traditional chemical adhesive, such as glue epoxy, or a double-stick tape, or else a mechanical adhesive member such as a hook and loop fastener such as VELCRO brand fasteners. The use of a VELCRO brand fasteners has the advantage of making the acoustic isolator removably attachable to the speaker cabinet 300. Such removable attachability is useful for facilitating replacement of the acoustic isolators 316 upon the speaker cabinet 300 if the acoustic isolators 316 wear out before the end of the useful life of the speaker cabinet 300. Additionally, it permits the user to selectively remove or attach the acoustic isolators 316 to the speaker cabinet 300 to fit differing circumstances wherein it may not be desirable to attach the acoustic isolator 316 to speaker cabinet 300, but then later re-attach the acoustic isolator 316 to the speaker cabinet if a need so arose.

In essence, acoustic isolators 310, 316, 320 comprise support members, generally similar to support members 16, 18, wherein the upper side surface 332 directly engages the base surface 326 of the speaker cabinet 300. As will be deduced, the acoustic isolators 310, 316, 320 do not have a platform support member, and are intended to be used in lieu of a platform 12 containing acoustic isolator 10.

One area where these acoustic isolators 310, 316, 320 have particular utility is in speaker cabinets that are "factory equipped" with acoustic isolators 310, 316, 320 by the manufacturer of the speaker cabinet. A speaker cabinet manufacturer attaches the acoustic isolators 310, 316, 320 directly to the underside surface 326 of the speaker cabinet 300 by glueing, stapling or other fastening means directly at the factory, so that the speaker-cabinet product shipped to the consumer comprises a combination speaker cabinet/ isolator device. Alternately, the isolators 310, 316, 320 can be designed to have no fixed attachment to the speaker cabinet 300, so that a user can arrange them appropriately on a floor or stage under whichever of his speaker cabinets he so chooses, in any configuration he so chooses.

The second alternate embodiment acoustic isolator 400 of the present invention is shown in FIGS. 9–19. The second alternate embodiment 400 is similar to the first alternate embodiment 300, (FIGS. 8 and 8a) as it comprises a block of foam material that is placeable under a speaker, that is devoid of the platform 12 of the first embodiment shown in FIG. 1.

Unlike isolator 300, acoustic isolator 400 comprises a two-piece foam member including a base member 410 and an incline member, such as wedge 412. As will be discussed in more detail below, the base member 410 can be used by itself, or in conjunction with the wedge 412 to provide a source of acoustical isolation between the sound producing body, such as a speaker cabinet 500, and a surface, such as a stage, floor or bookshelf upon which the speaker cabinet 500 rests.

The base member 410 and wedge member 412 are both preferably comprised of the same material as the platform support member 16, 18 of the embodiment shown in FIG. 1. Similar to platform support member 16, 18, base member 410 and wedge 412 are firm enough to support a speaker cabinet without undergoing significant compression that would tend to destabilize the speaker 500, and increase the frequency of vibration transmission. Additionally, base member 410 and wedge 412 must be soft enough to be sound absorbent, and resistant to the transmissions of vibrations therethrough. In this regard, the same material, having the same specification as is described in connection with support member 16, 18, of the first embodiment support 116 is the preferred material for use in manufacturing the base member 410 and wedge 412.

The base member 410 includes a floor-engaging, generally planar lower surface 416, a first side surface 418 and a second side surface 419 that are disposed in planes generally perpendicular to the major plane of the floor-engaging lower surface 416. Additionally, base member 410 includes a generally vertically extending front surface 422 and a generally vertically extending rear surface 424. A generally upwardly facing speaker engaging top portion 426 includes an inclined speaker-receiving surface 428 and a lip portion 432.

Although the floor-engaging surface 416, side surfaces 418, 419, front surface 422, rear surface 424 and inclined speaker receiving surface 428 are all described as being generally planar, not all these surfaces need to planar. Although the floor-engaging surface 416 and the inclined speaker receiving surface 428 are planar, the side surfaces 418, 419 and the front and rear surfaces 422, 424 need not be planar, and can be designed to have a variety of shapes to suit the aesthetic desires of the user.

The inclined speaker receiving surface 428 is generally inclined from back to front, such that the vertical height M of the rear portion of the base member 410 is greater than the height P of the front portion of the speaker receiving portion 428, adjacent to the point at which the front edge 436 of the speaker receiving surface 428 meets the vertically extending lip surface 440 of the lip portion 432. Preferably, the angle X of inclination of the incline surface 428, (relative to horizontal) is between about 0.5 and 10 degrees, and Applicants have found that a particularly useful embodiment has an inclination of about 4 degrees. In this regard, it will appreciated that, as used herein, this "horizontal" plane lies in a plane generally parallel to the floor-engaging surface 416 of the base member 410.

As will be described in more detail below, the inclined-from-horizontal nature of the speaker receiving surface 428 permits the user to place the speaker 500 thereon in an inclined orientation, so that the speaker can be inclined downwardly, or upwardly, or level depending upon the desires of the user. As will be appreciated, this change in inclination changes the projection angle of the sound being emitted from the speaker.

The upper surface of a lip portion 432 also includes an inclined surface 442. However, unlike inclined speaker receiving surface 428, surface 442 is inclined largely for aesthetic, rather than for functional reasons.

Figure 9:
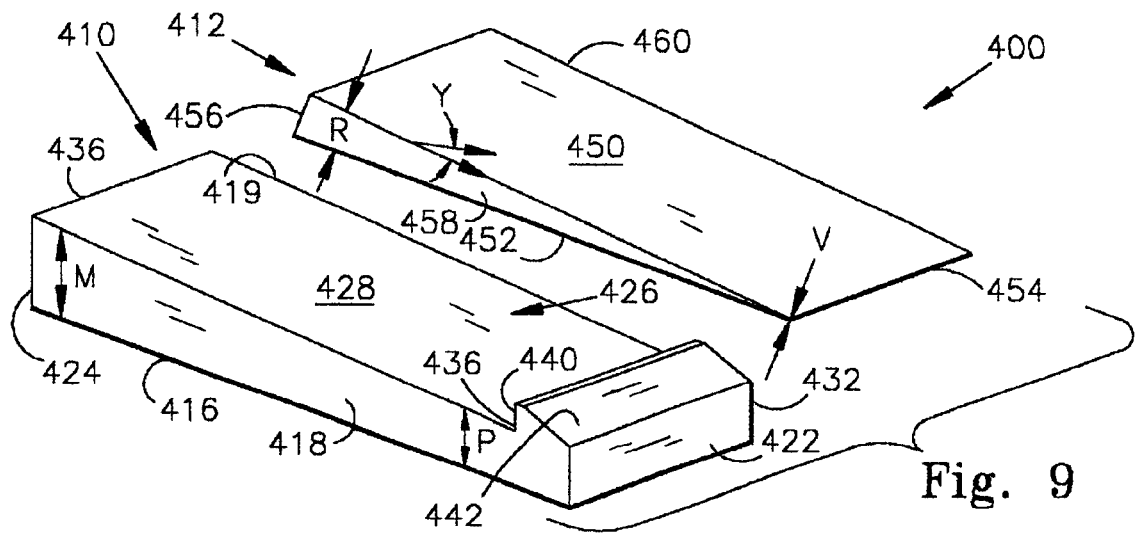
FIG. 9 is an exploded perspective view of a second alternate embodiment acoustic isolator.

The inclined wedge member 412 is shown in FIG. 9 as including an upper, inclined speaker receiving surface 450, a lower surface 452 that is designed for being received by, and placed in an opposed relation to the speaker receiving surface 428, when the base member 410 and wedge member 412 are used together, such as is shown in FIGS. 14–19. The wedge member 412 also includes a thin, front edge surface 454, and generally rear planar surface 456, along with generally planar, vertically extending first and second side edge surfaces 458, 460. Because of the wedge-shape of the wedge 412, the vertical heigh R—R, adjacent to the rear surface 456 is significantly greater than the vertical F—F adjacent to the front edge 454. Preferably, the height R—R measured at the rear of the wedge is approximately one (1) inch, whereas at the front, the height V—V is approximately ⅛ inch (0.125 inch). In this regard, the ongoing inclination angle Y of the speaker engaging surface 450 relative to horizontal is preferably between about 0.5 and 10 degrees, and optimally about 4 degrees. In this regard, it will be appreciated that the "horizontal" reference used for determining angle Y is a plane parallel to the plane of the lower surface 452.

Turning now to FIGS. 10–19, the various configurations of the device 400 will be described.

Figure 10:
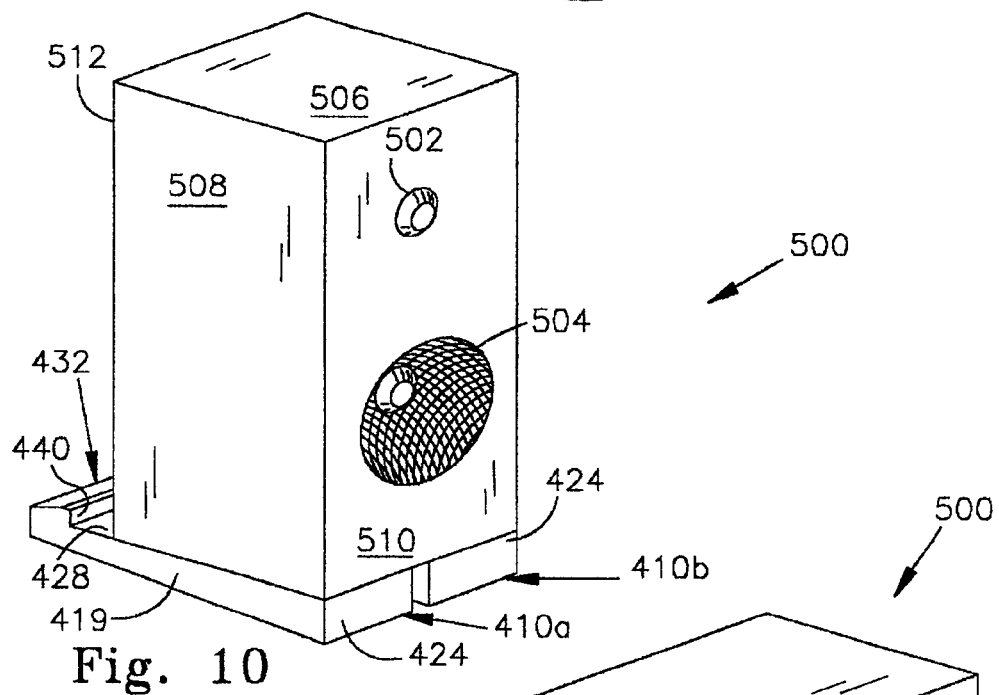
FIG. 10 is a perspective view of the second alternate embodiment acoustic isolator supporting an "upright" speaker cabinet in an upwardly inclined orientation.

Turning first to FIG. 10, the speaker cabinet 500 is shown being placed on a pair of base members 410a, 410b to place the speaker cabinet 500 in an upwardly inclined (relative to horizontal) orientation. Speaker cabinet 500 is representative of commonly used speaker cabinets and other sound producing bodies, and includes a front face 510 having a small tweeter-like speaker 502, and a larger, woofer-like speaker 504 that has the open ends of the speaker 502, 504 cones positioned to project sound outwardly in a direction generally perpendicular to the plane of speaker cabinet face 510. The speaker cabinet 500 includes a pair of small area end surfaces 506, a pair of larger area side surfaces 508, a front, speaker cone containing surface 510, and a rear surface 512. As shown in FIG. 10, the speaker cabinet 500 is placed upon one of the end surfaces, so that its lower end surface 506 is received by the upper surfaces 428 of the first and second base members 410a, 410b.

First and second base members 410a, 410b are placed in a spaced, parallel relationship wherein their rear surfaces 424 are disposed adjacent to the front surface 510 of the speaker cabinet 500, and their lower surfaces (those close to lip portion 432) are disposed adjacent to the rear surface 512 of the speaker cabinet. When so positioned, the speaker cabinet 500 is inclined upwardly, so that the projection axis of the first and second speaker 502, 504 is at an angle inclined from horizontal, at an angle generally equal to angle X. An upwardly inclined projection pattern from the speakers 502, 504 are useful in situations such as home speakers that are placed on the floors, or stage speakers that are being used as monitors. As the end surface 506 of the speaker cabinet 500 is generally smaller than the side surface 508, the two base members 410a, 410b are placed in a generally closely spaced parallel relation.

Figure 11:
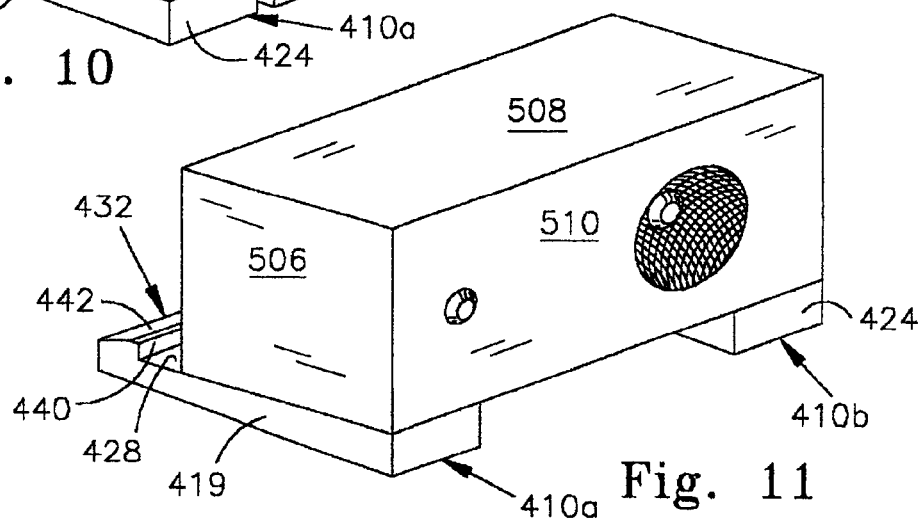
FIG. 11 is a perspective view of the second alternate embodiment acoustic isolator supporting a "laid-down" speaker cabinet in an upwardly inclined orientation.

Turning now to FIG. 11, it will be noted that the speaker cabinet 500 is "laid down" upon its side, so that one of the larger side surfaces 508 engages the upper surfaces 428 of the first and second base members 410a, 410b. Because of the larger size (area) of the side surface 508 (when compared to end surface 506), the base members 410a, 410b are placed in a spaced, parallel relation, wherein the spacing between the two base members 410a, 410b is significantly greater than the spacing between the two base members 410a, 410b in the configuration shown in FIG. 10.

Figure 12:
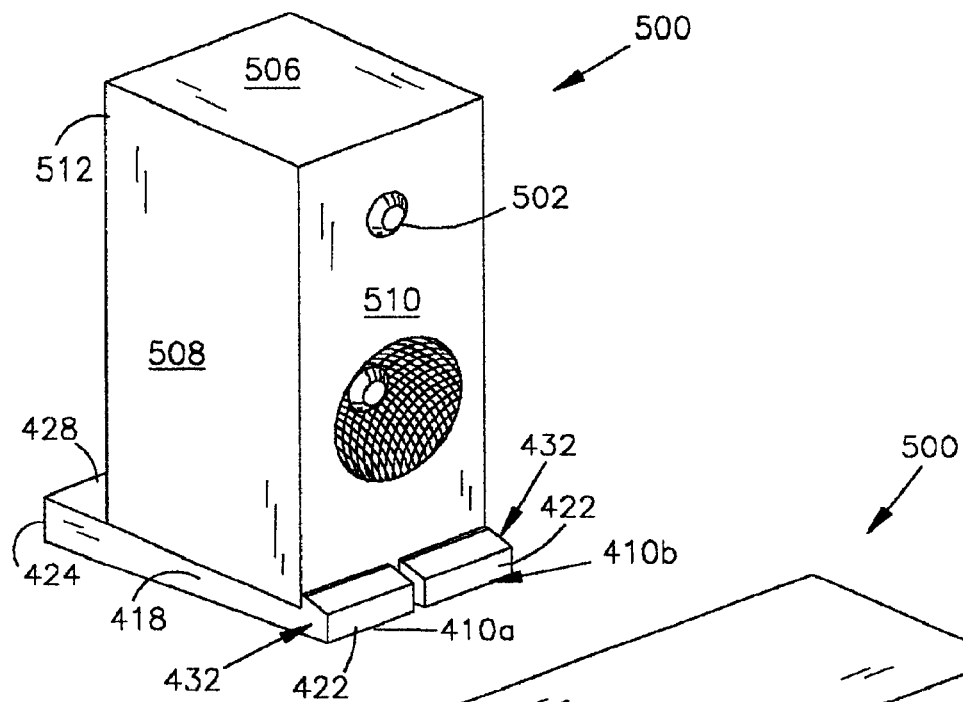
FIG. 12 is a perspective view of the second alternate embodiment acoustic isolator supporting an "upright" speaker cabinet in an downwardly inclined orientation.
Figure 13:
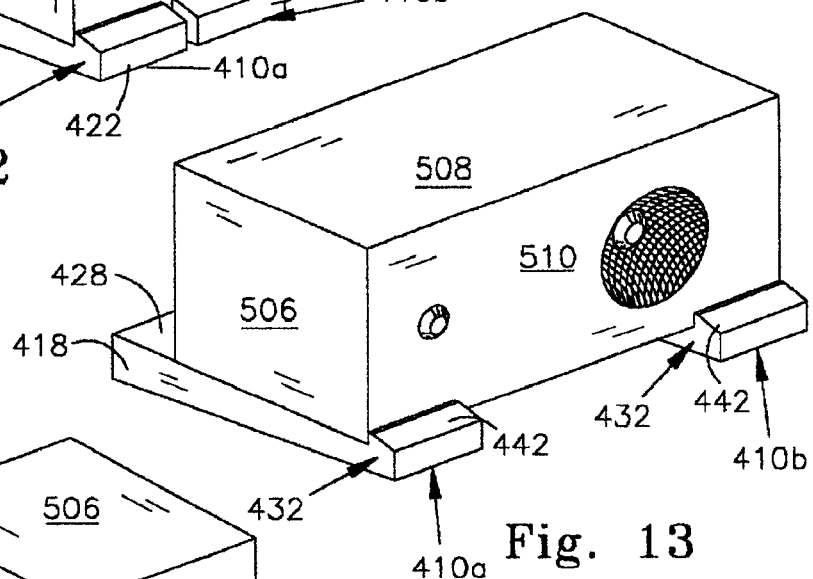
FIG. 13 is a perspective view of the second alternate embodiment acoustic isolator supporting a "laid-down" speaker cabinet in an downwardly inclined orientation.

Turning now to FIGS. 12 and 13, it will be noted that the speaker cabinet 500 is positioned upon base member 410a, 410b in a position that is, essentially, rotated 180 degrees about a vertical axis from the position shown in FIGS. 10 and 11. In this position, the front face 510 of the speaker cabinet is placed adjacent to the lip portion 432 of the base member 410a, 410b, with the rear surface 512 of the speaker being placed adjacent to the relatively raised rear surface 424 of the base members 410a, 410b. FIG. 12 shows the speaker cabinet 500 in its upright position with the base members 410a, 410b being placed in a closely spaced parallel relation, and FIG. 13 shows the speaker cabinet being placed in a laid-down position on its side, with the first and second base members 410a, 410b being placed in a relatively distally spaced parallel relation.

When the speaker cabinet 500 is placed upon the base members 410a, 410b in the configurations shown in FIGS. 12 and 13, the projection axes of the speakers 502, 510 will be at an angle X that is about 4 degrees below horizontal, and is inclined generally downwardly from horizontal. The orientation shown in FIGS. 12 and 13 is particularly useful for speaker cabinets 500 that are placed on raised shelves and are intended to project sound generally downwardly to a listener position below the speaker. Such a configuration is useful in a studio control room setting wherein speakers are often placed on bookshelves that are situated above the position of the musician/producer seated at the console.

Figure 14:
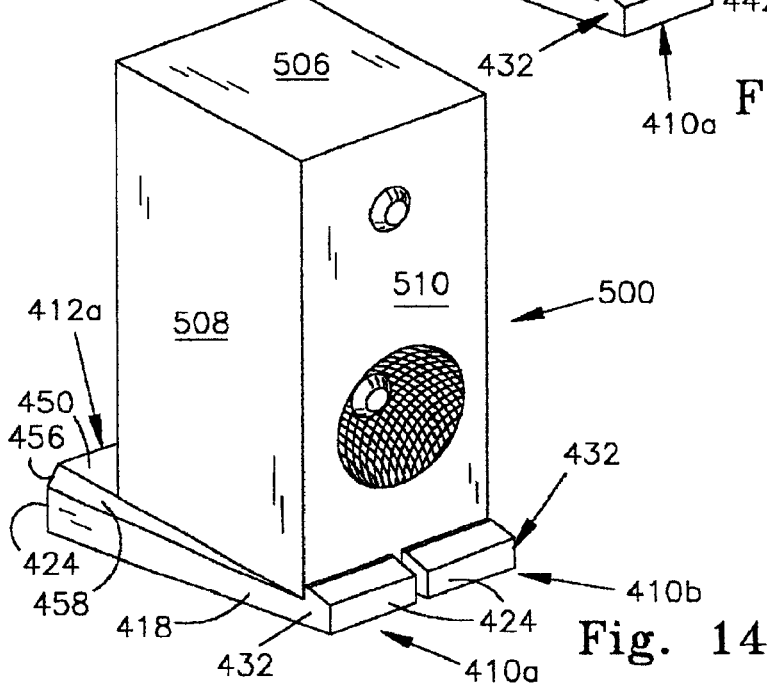
FIG. 14 is a perspective view of the second alternate embodiment acoustic isolator supporting an "upright" speaker cabinet in an intensely-downwardly inclined orientation.
Figure 15:
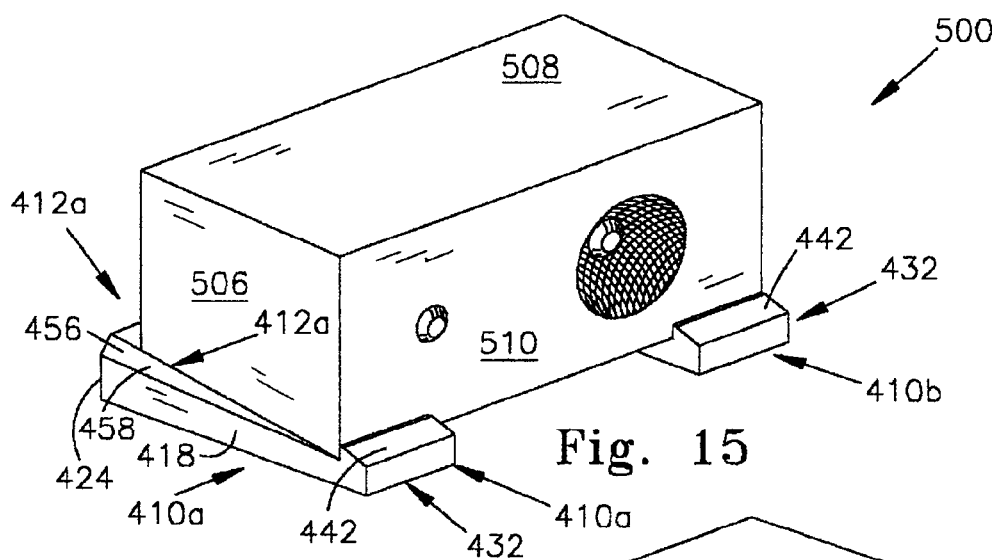
FIG. 15 is a perspective view of the second alternate embodiment acoustic isolator supporting a "laid-down" speaker cabinet in an intensely-downwardly inclined orientation.

FIGS. 14 and 15 illustrate the second alternate embodiment acoustic isolators 410a, 410b in an intensely downwardly inclined orientation. It will be noted that face 510 of the speaker cabinet 500 is disposed adjacent to the lip portion 432 of the isolators 410a, 410b, thus taking advantage of the downwardly inclined speaker receiving surface 428 of the acoustic isolator base members 410a, 410b. Additionally, wedge members 412a, 412b are placed with respect to the respective acoustic isolator bases 410a, 410b in a position wherein the speaker receiving surfaces 450 of the wedges 412a, 412b are inclined downwardly. To achieve this, the knife edge of the wedge-shaped front edge 454 of the wedge 412 is disposed adjacent to the lip 432, with the relatively larger rear surface 456 being disposed adjacent to the relatively larger rear surface 424 of the base members 410a, 410b. This exaggerates the angle of downward inclination, so that the speaker cabinet is angled downwardly from horizontal by X+Y degrees or approximately 8 degrees representing the combined angles of inclination of both the speaker-receiving surface 428 of the base member 410a, 410b, and the downward inclination of the speaker receiving surface 450 of the wedge member 412. As alluded to above, this causes the axes of projection of the speakers 502, 504 to be tilted downwardly, approximately 8 degrees from horizontal.

Figure 16:
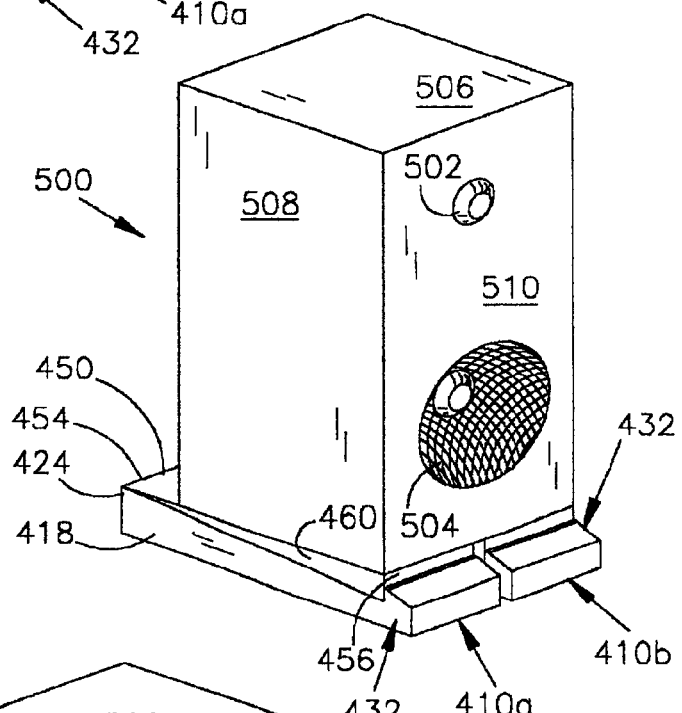
FIG. 16 is a perspective view of the second alternate embodiment acoustic isolator supporting an "upright" speaker cabinet in a level (non-inclined) orientation.
Figure 17:
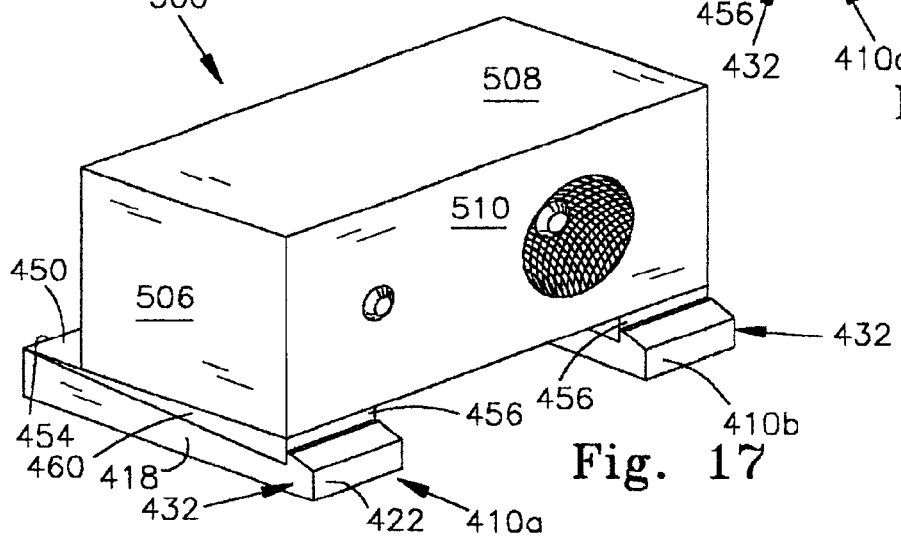
FIG. 17 is a perspective view of the second alternate embodiment acoustic isolator supporting a "laid-down" speaker cabinet in a level (non-inclined) orientation.

Turning now to FIGS. 16 and 17, the speakers 500 are shown being placed on the acoustic isolators 410a, 410b in a position wherein the speakers are generally level, so that the axes of projection of the speakers 502, 504 are generally in a plane parallel to the floor or resting surface upon which the acoustic isolators 410a, 410b are placed. This is achieved by the base members 410a, 410b and wedge members 412a, 412b, being placed in a head-to-tail relationship, wherein the larger rearward edge 456 of the wedge 412 is placed adjacent to the lip 432, and the knife edge 454 of the wedge 412 is placed adjacent to the larger rearward edge 424 of the base member 410a, 410b. In such case, as angles X and Y of inclination are generally equal angles, the downward inclination of angle X caused by the forwardly inclined nature of speaker receiving surface 428 is counter-balanced and offset by the opposite and equal inclination of angle Y of the relatively upwardly inclined wedge 412. The configuration shown in FIGS. 16 and 17 is very useful in a situation wherein the user desires that the axes of projection of the speakers 502, 504 be neither inclined upwardly nor downwardly.

Turning finally to FIGS. 18 and 19, a configuration of the base members 410a, 410b and wedges 412a, 412b are shown in an intensely upwardly inclined position. In the configuration shown in FIGS. 18 and 19, the front face 510 of the speaker cabinet 500 is positioned generally co-planarly with and adjacent to the relatively larger rearward surfaces 456 of the first and second wedge members; and also co-planarly with and adjacent to the relatively larger rear surfaces 424 of the first and second base members 410a, 410b. As will be appreciated, the angle of inclination, relative to horizontal equals the sums of angles X+Y, or approximately 8 degrees upwardly inclined from horizontal.

In summary, the various inclinations of the configurations shown in FIGS. 10–19 as presented below in Table I. In reviewing Table I, it should be noted that the degrees are given as being from "horizontal". However, as used in this context, the term "horizontal" refers more appropriately to the plane of the resting surface upon which the base members 410a, 410b rest. As most floors and stages are generally horizontal, the degrees of inclination given in Table I, and above, will generally be fairly accurate, and truly "be" from absolute horizontal. However, if the floor or stage is at an inclined angle, the degrees of inclination (both positive and negative) from horizontal will actually be degrees of inclination from the resting surface, which would vary from horizontal by the degree of inclination of the resting surface.

It will also be appreciated that Table I shows the degrees of inclination for a preferred embodiment of the present invention, wherein the degree of inclination of angle X is 4 degrees and the degree of inclination of angle Y is 4 degrees. However, the degree of angles X and Y can vary from this preferred value. For example, the applicants have found that the device will perform well of angle X, the angle of the inclination of the speaker body receiving surface 428, of the base member 410 is between about 0 degrees and 10 degrees. Similarly, the device will perform its intended function at the angle Y of inclination of wedge 412 is between about 0 degrees and 10 degrees.

It should also be recognized that the limits on the degrees of inclination of the base member 410 and wedge 412 are most critical in the intensely upwardly-inclined configuration shown in FIGS. 18 and 19, and the intensely downwardly inclined configurations of FIGS. 14 and 15, as the angles of inclination of the base member 410 and wedge 412 are additive. Due to the additively inclined nature of the configuration shown in FIGS. 14, 15, 18 and 19, a risk exists that the speaker body 510 will not be able to be maintained upon the upper surface of the acoustic isolator 400 if the angle (either upwardly or downwardly) is too great, relative to center of gravity of the speaker body 500, and the frictional co-efficient of the engagement between the speaker 500 and the upper surfaces of the device 400. Conversely, the relative angles are least critical in the configuration shown in FIGS. 16 and 17 since the angles of inclination of the base members 410a, 410b; and the wedge members 412a, 412b offset each other due to their placement in a head-to-tail relation.

TABLE 1

Table of Exemplary Inclinations, relative to resting surface for configurations shown in FIGS. 10–19
Angle x = 4°
Angle y = 4°

| FIG. | Angle of inclination from "horizontal" |
|---|---|
| 10 and 11 | horizontal plus 4° |
| 12 and 13 | horizontal minus 4° |
| 14 and 15 | horizontal minus 8° |
| 16 and 17 | horizontal plus 0° |
| 18 and 19 | horizontal plus 8° |

Figure 20:
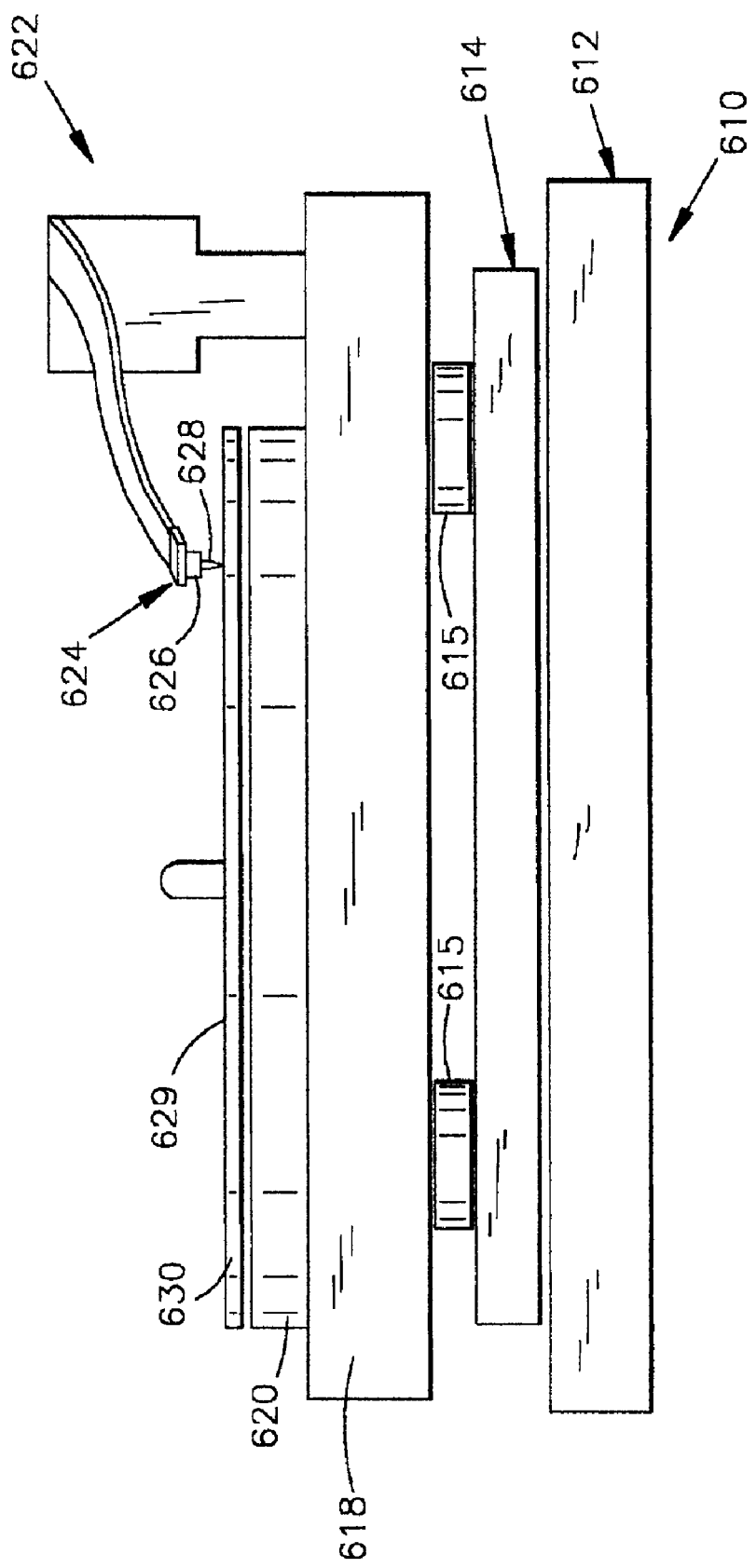
FIG. 20 is a front view of the third alternate embodiment acoustic isolator supporting a stereo turntable.

Turning now to FIG. 20, a third alternate embodiment of the acoustic isolator 610 of the present invention is shown. Acoustic isolator 610 is designed for use with a sound producing body, such as a record player 616. As will be appreciated, the forces impacting a record player 616 are almost directly opposed to those affecting a sound producing body such as a speaker 500. Whereas a speaker produces a large amount of vibrations that may be induced into the floor or stage surface upon which the speaker 500 rests, the vibrations that exist in the floor surface, stage surface, or in most cases, table surface upon which the turn-table 616 rests, induce vibrations in the turn-table that can either cause feedback, or more usually, cause the tone arm of the turn-table to lose its proper tracking within the grooves of the record 630, and thereby skip.

The isolator 610 of FIG. 20 includes a mat-like foam member 612 that is preferably comprised from the same material as the foam members 16, 18 of the acoustic isolator 10 shown in FIG. 1. However, unlike the brick-shaped foam member 16 of the isolator 10 shown in FIG. 1, foam member 612 generally comprises a one-piece door-mat-shaped member that is usually either square or rectangular in shape, and that is sized generally to have an area similar to or greater than the area of the record player 616 supported by the isolator 610. Of course, the shape of foam member can be other than square or rectangular to appease aesthetic concerns. Platform 614 is constructed generally similarly to platform 12 of FIG. 1, and is fixedly coupled to the foam member 612 to overlay the foam member 612. The platform 614 includes an upper surface for receiving the record player 616, and upon which the record player 616 rests.

The record player 616 includes legs 615 that are preferably "cushioned" to help dampen vibrations received from the surface upon which the record player 616 rests. The record player also includes a base 618 for supporting the rotatable turntable 620. The record player 616 further includes a turn arm assembly 622 that includes a head unit 624 at its distal end. A cartridge 626 is affixed to the head unit 624, and includes a record groove following needle 628, that follows the grooves formed in the upper surface 629 of the record 630.

Although the invention has been described in detail with reference to the illustrated preferred embodiments, variations and modifications exist within the scope and sphere of the invention as described and defined in the following claims.

What is claimed:

1. An acoustic isolator for placement between a sound producing body and a resting surface, the acoustic isolator comprising a foam member and a platform member, the foam member having a first surface for receiving the platform member and a second surface for engaging the resting surface, the foam member comprising a supportive foam member capable of substantially preventing the transfer of sound induced vibrations between the sound producing body and the resting surface while supporting the sound producing body and while sustaining an internal deflection of less than about thirty percent, and the platform member being coupled to the first surface of the foam member for receiving the sound producing body, the platform member being composed of a material less compressible than the material from which the foam member is comprised, the platform member including a rigid core member having a sound absorbing platform covering member.

2. The acoustic isolator of claim 1 wherein the platform covering member comprises a cloth platform covering member having greater sound absorbing properties than the core member, the core member being comprised of a material selected from the group consisting of wood, particle board, fiber board, masonite and metal, and the platform covering material comprising a cloth material selected from the group consisting of natural cloth material, synthetic cloth material and ozites.

3. The acoustic isolator of claim 1 wherein the rigid core member is comprised of a slab like member having sufficient strength to support at least about 36 kg without undergoing any significant deformation.

4. The acoustic isolator of claim 3 wherein the supportive foam member has a firmness of between about 70 and 200 pounds for 25% Internal Force Deflection.

5. The acoustic isolator of claim 4 wherein the supportive foam member has a firmness of between about 115 and 135 pounds for 25% Internal Force Deflection.

6. An acoustic isolator for placement between a sound producing body and a resting surface, the acoustic isolator comprising a foam member having a first surface for receiving the sound producing body and a second surface for engaging the resting surface wherein the foam member comprises a supportive foam member capable of substantially preventing the transfer of sound induced vibrations between the sound producing body and the resting surface while supporting the sound producing body, the foam member having:
a firmness of between about 70 and 200 pounds for 25% Internal Force Deflection,
a density of between about 2.3 and 2.5 pounds per cubic foot, and
an acoustic isolation ability of between about six and ten decibels.

7. The acoustic isolator of claim 6 wherein the sound producing body comprises at least one of a speaker cabinet, amplifier and turn table.

8. An acoustic isolator for placement between a sound producing body and a resting surface, the acoustic isolator comprising a foam member having a first surface for receiving the sound producing body and a second surface for engaging the resting surface wherein the foam member comprises a supportive foam member capable of substantially preventing the transfer of sound induced vibrations between the sound producing body and the resting surface while supporting the sound producing body and while sustaining an internal deflection of less than about thirty percent, the supportive foam member including a generally planar second surface, and an inclined first surface disposed in a plane inclined from the second surface.

9. The acoustic isolator of claim 8 wherein the supportive foam member includes a second supportive foam member having a planar second surface, and an inclined first surface disposed in a plane inclined from the second surface.

10. The acoustic isolator of claim 9 wherein the inclined first surface of the first supportive foam member is sized and configured for receiving at least one of the first and second surfaces of the second supportive foam member.

11. The acoustic isolator of claim 9 wherein the inclined surface of the first supportive foam member is configured to permit a sound producing body placed thereon to be inclined upwardly or downwardly relative to the resting surface.

12. The acoustic isolator of claim 9 wherein the first surface of the first supportive foam member is inclined from the second surface of the first supportive member by between 0.5 and 10 degrees; and the first surface of the second supportive member is inclined from the second surface of the second supportive foam member by between 0.5 and 10 degrees.

13. The acoustic isolator of claim 12, wherein the first and second supportive foam members are configurable to permit a sound producing body to be placed thereon at an inclination, relative to the resting surface, of between about 20 degrees above horizontal and 20 degrees below horizontal.

14. The acoustic isolator of claim 13 wherein the first and second supportive foam members are configurable to permit the sound producing body to be placed thereon at an inclination, relative to the resting surface, of between about eight degrees above horizontal and eight degrees below horizontal.

15. The acoustic isolator of claim 8 wherein the first surface of the first supportive foam member is inclined from the second surface of the first supportive member by between 0.5 and 10 degrees.

16. The acoustic isolator of claim 8 wherein the first surface of the supportive member includes a first end and a second end, and the first supportive foam member includes a lip portion disposed adjacent to the first end of the first supportive foam member, the lip portion extending above the plane of the first surface at the first end.

17. An acoustic isolator for placement between a sound producing body and a resting surface, the acoustic isolator comprising a platform member, and at least one platform support member, the platform member including a generally planar upper surface, and a lower surface, the planar upper surface being configured to provide a supporting surface upon which the sound producing body can be placed, the at least one platform support member including an upper surface coupled to the platform member, and a resting surface engageable lower surface, further comprising a foam sound absorber panel fixedly coupled to the lower surface of the platform member, wherein the at least one platform support member comprises at least two platform support members attached to the lower surface of the platform member in a spaced relation to define a space therebetween, the foam sound absorber being attached to the lower surface of the platform member in said space therebetween, the foam sound absorber panel having a firmness of less than about 70 pounds for a 25% Internal Force Deflection, and the platform support member having a firmness of between about 70 and 200 pounds for 25% Internal Force Deflection.

18. An acoustic isolator for placement between a sound producing body and a resting surface, the acoustic isolator comprising a foam member having a first surface for receiving the sound producing body and a second surface for engaging the resting surface wherein the foam member comprises a supportive foam member capable of substantially preventing the transfer of sound induced vibrations between the sound producing body and the resting surface and capable of supporting, by itself, a sound producing body weighing at least about 80 pounds, while sustaining an internal deflection of less than about thirty percent.

19. The acoustic isolator of claim 18 wherein the supportive foam member has a firmness of between about 70 and 200 pounds for 25% Internal Force Deflection.

20. The acoustic isolator of claim 19 wherein the foam member has an acoustic isolation ability of between about six and ten decibels.

21. The acoustic isolator of claim 20 wherein the supportive foam member has a density of between about 2.3 and 2.5 pounds per cubic foot.

22. The acoustic isolator of claim 18 wherein the first surface of the foam member and the second surface of the foam member are generally planar, the first surface being attachable to the sound producing body.

23. The acoustic isolator of claim 18 wherein the first surface of the foam member and the second surface are generally planar, further comprising an attachment member for attaching the first surface of the foam member to the sound producing body.

24. The acoustic isolator of claim 23 wherein the attachment member is selected from the group consisting of tape, double stick tape, chemical adhesives, glue, mechanical fasteners and hook-and-loop type fasteners.

25. An acoustic isolator attached to a sound producing body for placement between the sound producing body and a resting surface, the acoustic isolator comprising a foam member having a first surface attached to the sound producing body and a second surface for engaging the resting surface wherein the foam member comprises a supportive foam member capable of substantially preventing the transfer of sound induced vibrations between the sound producing body and the resting surface and capable of supporting, by itself, a sound producing body weighing at least about 80 pounds, while sustaining an internal deflection of less than about thirty percent.

* * * * *